United States Patent [19]

Geprägs et al.

[11] Patent Number: 6,127,496
[45] Date of Patent: Oct. 3, 2000

[54] CATALYTIC PATTERNS CONTAINING METAL COMPLEXES WITH AN ADAMANTANE-LIKE STRUCTURE

[75] Inventors: Michael Geprägs, Bobenheim Roxheim; Rainer Stürmer, Rödersheim; Horst Weiss, Karlsruhe; Susanne Steiger, Römerberg, all of Germany

[73] Assignee: BASF Aktiengesellschaft, Luwigshafen, Germany

[21] Appl. No.: 09/284,417

[22] PCT Filed: Sep. 23, 1997

[86] PCT No.: PCT/EP97/05201

§ 371 Date: Apr. 14, 1999

§ 102(e) Date: Apr. 14, 1999

[87] PCT Pub. No.: WO98/16564

PCT Pub. Date: Apr. 23, 1998

[30] Foreign Application Priority Data

Oct. 14, 1996 [DE] Germany ................. 196 42 353

[51] Int. Cl.[7] .................. C08F 4/78; C08F 4/642; C08F 12/04
[52] U.S. Cl. .............. 526/127; 526/126; 526/131; 526/133; 526/134; 526/153; 526/160; 526/161; 526/346; 526/347; 502/103; 502/117; 502/152; 502/154; 556/52
[58] Field of Search .................. 502/103, 117, 502/152, 154; 526/126, 127, 133, 134, 131, 153, 160, 170, 161, 346, 347, 943; 556/52

[56] References Cited

U.S. PATENT DOCUMENTS 4,794,096 12/1988 Ewen .
5,502,133 3/1996 Ishihara et al. ............. 526/346 X
5,707,913 1/1998 Schlund et al. .

FOREIGN PATENT DOCUMENTS

| 271 874 | 6/1988 | European Pat. Off. . |
|---|---|---|
| 284 708 | 10/1988 | European Pat. Off. . |
| 0 416 815 | 3/1991 | European Pat. Off. ............. 526/347 |
| 91/09882 | 7/1991 | WIPO . |
| 93/03067 | 2/1993 | WIPO . |
| 95/06071 | 3/1995 | WIPO . |

OTHER PUBLICATIONS

Beilsteins Handbuch der Org. chem. 1922, 367/474/485.

*Primary Examiner*—Fred Teskin
*Attorney, Agent, or Firm*—Keil & Weinkauf

[57] ABSTRACT

A catalyst system containing as active constituents
A) metal complexes of the formula I

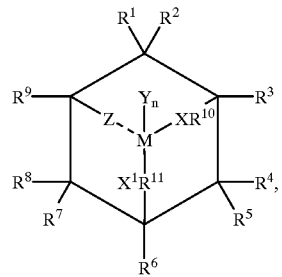

wherein the substituents have the meanings set forth in the specification and
B) a compound capable of forming metallocenium ions.

9 Claims, No Drawings

CATALYTIC PATTERNS CONTAINING METAL COMPLEXES WITH AN ADAMANTANE-LIKE STRUCTURE

The present invention relates to catalyst systems comprising as active constituents
A) Metal complexes of the formula I

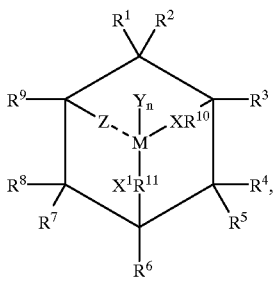

where the substituents have the following meanings:
M is a metal of transition group III, IV, V or VI of the Periodic Table of the Elements or a metal of the lanthanide series,
Y is a negative leaving atom or a negative leaving group,
X and $X^1$ are negatively charged or uncharged atoms of main group IV, V or VI of the Periodic Table of the Elements,
Z is hydrogen, $C_1$–$C_{10}$-alkyl, $C_3$–$C_{10}$-cycloalkyl, $C_1$–$C_{10}$-alkoxy, $C_1$–$C_{10}$-alkylthio or dialkylamido having from 1 to 4 carbon atoms in each alkyl radical,
$R^1$ to $R^{11}$ are hydrogen, carboorganic or organosilicon radicals,
n is 0, 1 or 2
and
the valence of M is 2+n,
and
B) a compound capable of forming metallocenium ions.

The present invention further relates to the use of such catalyst systems for polymerizing olefinically unsaturated compounds, a process for preparing polymers of vinylaromatic compounds with the aid of these catalyst systems and also the polymers obtainable in this way.

Metallocene complexes are known as constituents of catalyst complexes for polymerizing olefinically unsaturated compounds. For example, WO 95/06071 describes heterofunctional compounds containing cyclopentadienyl radicals. However, this class of compounds is not able to effectively suppress chain transfer by β-hydride elimination, which leads to premature stopping of the polymerization and thereby to limited molecular weights.

DE-A 44 20 783 discloses heterofunctional, cyclopentadienyl-free compounds which, however, have an open catalyst structure and are therefore not stereoselective or favor chain transfer by β-hydride elimination.

It is an object of the present invention to provide novel catalyst systems which can be used for polymerizing vinylaromatic compounds and in the process effectively suppress β-hydride elimination and are stereoselective. In addition, the polymers formed should have a high molecular weight and a high proportion of syndiotactic structure.

We have found that this object is achieved by the catalyst systems defined at the outset.

We have also found the use of such catalyst systems for polymerizing olefinically unsaturated compounds, a process for preparing polymers of vinylaromatic compounds with the aid of these catalyst systems and the polymers obtainable in this way.

The catalyst systems of the present invention comprise, as component A), metal complexes of the formula I.

Among the metal complexes of the formula I, preference is given to those in which the substituents have the following meanings:
M is a metal of transition group IV or V of the Periodic Table of the Elements, preferably a metal of transition group IV, i.e. titanium, zirconium or hafnium, in particular titanium,
Y is hydrogen, $C_1$–$C_{10}$-alkyl, $C_3$–$C_{10}$-cycloalkyl, $C_1$–$C_{10}$-alkoxy, dialkylamido, alkylaryl, arylalkyl, haloalkyl or haloaryl each having from 1 to 10 carbon atoms in the alkyl radical and from 6 to 20 carbon atoms in the aryl radical, or fluorine, chlorine, bromine or iodine, preferably $C_1$–$C_4$-alkyl, $C_1$–$C_4$-alkoxy or chlorine, in particular methyl, isobutyl, methoxy, isopropoxy or chlorine,
X and $X^1$ are negatively charged atoms of main group V or VI of the Periodic Table of the Elements, preferably N, P, O or S as anion,
Z is hydrogen, $C_1$–$C_4$-alkyl or $C_4$–$C_6$-cycloalkyl, preferably hydrogen, methyl, ethyl, n-propyl or cyclohexyl,
$R^1$ to $R^{11}$ are hydrogen, $C_1$–$C_{10}$-alkyl, $C_3$–$C_{10}$-cycloalkyl, $C_6$–$C_{20}$-aryl, alkylaryl, arylalkyl, haloalkyl or haloaryl each having from 1 to 10 carbon atoms in the alkyl radical and from 6 to 20 carbon atoms in the aryl radical, or fluorine, chlorine, bromine or iodine, or two adjacent radicals may together form a cyclic group having from 4 to 5 carbon atoms, or $Si(R^{12})_3$ where
$R^{12}$ is $C_1$–$C_{10}$-alkyl, $C_3$–$C_{10}$-cycloalkyl or $C_6$–$C_{15}$-aryl, and
n is preferably 2, so that the valence of M is preferably +4.
$R^1$ to $R^{11}$ are preferably hydrogen or $C_1$–$C_{10}$-alkyl, in particular
$R^1$ to $R^8$ are hydrogen, methyl or ethyl,
$R^9$ is hydrogen, methyl, ethyl or n-propyl and
$R^{10}$ and $R^{11}$ are methyl, ethyl, n-propyl or isopropyl.

Examples of particularly preferred metal complexes of the formula I are:
5,5-dimethyl-1,3-di(methylamido)cyclohexanetitanium dichloride
5,5-diethyl-1,3-di(methylamido)cyclohexanetitanium dichloride
5,5-dipropyl-1,3-di(methylamido)cyclohexanetitanium dichloride
5,5-diisopropyl-1,3-di(methylamido)cyclohexanetitanium dichloride
5,5-dibutyl-1,3-di(methylamido)cyclohexanetitanium dichloride
5,5-di-sec-butyl-1,3-di(methylamido)cyclohexanetitanium dichloride
5,5-di-tert-butyl-1,3-di(methylamido)cyclohexanetitanium dichloride
5,5-dimethyl-1,3-di(ethylamido)cyclohexanetitanium dichloride
5,5-diethyl-1,3-di(ethylamido)cyclohexanetitanium dichloride
5,5-dipropyl-1,3-di(ethylamido)cyclohexanetitanium dichloride
5,5-diisopropyl-1,3-di(ethylamido)cyclohexanetitanium dichloride
5,5-di-sec-butyl-1,3-di(ethylamido)cyclohexanetitanium dichloride
5,5-di-tert-butyl-1,3-di(ethylamido)cyclohexanetitanium dichloride
5,5-dimethyl-1,3-di(propylamido)cyclohexanetitanium dichloride
5,5-diethyl-1,3-di(propylamido)cyclohexanetitanium dichloride 5,5-dipropyl-1,3-di(propylamido)cyclohexanetitanium dichloride
5,5-diisopropyl-1,3-di(propylamido)cyclohexanetitanium dichloride
5,5-dibutyl-1,3-di(propylamido)cyclohexanetitanium dichloride
5,5-di-sec-butyl-1,3-di(propylamido)cyclohexanetitanium dichloride
5,5-di-tert-butyl-1,3-di(propylamido)cyclohexanetitanium dichloride
5,5-dimethyl-1,3-di(propylamido)cyclohexanetitanium dichloride
5,5-diethyl-1,3-di(isopropylamido)cyclohexanetitanium dichloride
5,5-dipropyl-1,3-di(isopropylamido)cyclohexanetitanium dichloride
5,5-diisopropyl-1,3-di(isopropylamido)cyclohexanetitanium dichloride
5,5-dibutyl-1,3-di(isopropylamido)cyclohexanetitanium dichloride
5,5-di-sec-butyl-1,3-di(isopropylamido)cyclohexanetitanium dichloride
5,5-di-tert-butyl-1,3-di(isopropylamido)cyclohexanetitanium dichloride
5,5-dimethyl-1,3-di(butylamido)cyclohexanetitanium dichloride
5,5-diethyl-1,3-di(butylamido)cyclohexanetitanium dichloride
5,5-dipropyl-1,3-di(butylamido)cyclohexanetitanium dichloride
5,5-diisopropyl-1,3-di(butylamido)cyclohexanetitanium dichloride
5,5-dibutyl-1,3-di(butylamido)cyclohexanetitanium dichloride
5,5-di-sec-butyl-1,3-di(butylamido)cyclohexanetitanium dichloride
5,5-di-tert-butyl-1,3-di(butylamido)cyclohexanetitanium dichloride
5,5-dimethyl-1,3-di(methylamido)cyclohexanedimethyltitanium
5,5-diethyl-1,3-di(methylamido)cyclohexanedimethyltitanium
5,5-dipropyl-1,3-di(methylamido)cyclohexanedimethyltitanium
5,5-diisopropyl-1,3-di(methylamido)cyclohexanedimethyltitanium
5,5-dibutyl-1,3-di(methylamido)cyclohexanedimethyltitanium
5,5-di-sec-butyl-1,3-di(methylamido)cyclohexanedimethyltitanium
5,5-di-tert-butyl-1,3-di(methylamido)cyclohexanedimethyltitanium
5,5-dimethyl-1,3-di(ethylamido)cyclohexanedimethyltitanium
5,5-diethyl-1,3-di(ethylamido)cyclohexanedimethyltitanium
5,5-dipropyl-1,3-di(ethylamido)cyclohexanedimethyltitanium
5,5-diisopropyl-1,3-di(ethylamido)cyclohexanetitanium dichloride
5,5-di-sec-butyl-1,3-di(ethylamido)cyclohexanedimethyltitanium
5,5-di-tert-butyl-1,3-di(ethylamido)cyclohexanedimethyltitanium
5,5-dimethyl-1,3-di(propylamido)cyclohexanedimethyltitanium
5,5-diethyl-1,3-di(propylamido)cyclohexanedimethyltitanium
5,5-dipropyl-1,3-di(propylamido)cyclohexanedimethyltitanium
5,5-diisopropyl-1,3-di(propylamido)cyclohexanedimethyltitanium
5,5-dibutyl-1,3-di(propylamido)cyclohexanedimethyltitanium
5,5-di-sec-butyl-1,3-di(propylamido)cyclohexanedimethyltitanium
5,5-di-tert-butyl-1,3-di(propylamido)cyclohexanedimethyltitanium
5,5-dimethyl-1,3-di(propylamido)cyclohexanedimethyltitanium
5,5-diethyl-1,3-di(isopropylamido)cyclohexanedimethyltitanium
5,5-dipropyl-1,3-di(isopropylamido)cyclohexanedimethyltitanium
5,5-diisopropyl-1,3-di(isopropylamido)cyclohexanedimethyltitanium
5,5-dibutyl-1,3-di(isopropylamido)cyclohexanedimethyltitanium
5,5-di-sec-butyl-1,3-di(isopropylamido)cyclohexanedimethyltitanium
5,5-di-tert-butyl-1,3-di(isopropylamido)cyclohexanedimethyltitanium
5,5-dimethyl-1,3-di(butylamido)cyclohexanedimethyltitanium
5,5-diethyl-1,3-di(butylamido)cyclohexanedimethyltitanium
5,5-dipropyl-1,3-di(butylamido)cyclohexanedimethyltitanium
5,5-diisopropyl-1,3-di(butylamido)cyclohexanedimethyltitanium
5,5-dibutyl-1,3-di(butylamido)cyclohexanedimethyltitanium
5,5-di-sec-butyl-1,3-di(butylamido)cyclohexanedimethyltitanium
5,5-di-tert-butyl-1,3-di(butylamido)cyclohexanedimethyltitanium
5,5-dimethyl-1,3-di(methylamido)cyclohexanetitanium diisopropoxide
5,5-diethyl-1,3-di(methylamido)cyclohexanetitanium diisopropoxide
5,5-dipropyl-1,3-di(methylamido)cyclohexanetitanium diisopropoxide
5,5-diisopropyl-1,3-di(methylamido)cyclohexanetitanium diisopropoxide
5,5-dibutyl-1,3-di(methylamido)cyclohexanetitanium diisopropoxide
5,5-di-sec-butyl-1,3-di(methylamido)cyclohexanetitanium diisopropoxide
5,5-di-tert-butyl-1,3-di(methylamido)cyclohexanetitanium diisopropoxide
5,5-dimethyl-1,3-di(ethylamido)cyclohexanetitanium diisopropoxide
5,5-diethyl-1,3-di(ethylamido)cyclohexanetitanium diisopropoxide
5,5-dipropyl-1,3-di(ethylamido)cyclohexanetitanium diisopropoxide
5,5-diisopropyl-1,3-di(ethylamido)cyclohexanetitanium diisopropoxide
5,5-di-sec-butyl-1,3-di(ethylamido)cyclohexanetitanium diisopropoxide
5,5-di-tert-butyl-1,3-di(ethylamido)cyclohexanetitanium diisopropoxide
5,5-dimethyl-1,3-di(propylamido)cyclohexanetitanium diisopropoxide
5,5-diethyl-1,3-di(propylamido)cyclohexanetitanium diisopropoxide 5,5-dipropyl-1,3-di(propylamido)cyclohexanetitanium diisopropoxide
5,5-diisopropyl-1,3-di(propylamido)cyclohexanetitanium diisopropoxide
5,5-dibutyl-1,3-di(propylamido)cyclohexanetitanium diisopropoxide
5,5-di-sec-butyl-1,3-di(propylamido)cyclohexanetitanium diisopropoxide
5,5-di-tert-butyl-1,3-di(propylamido)cyclohexanetitanium diisopropoxide
5,5-dimethyl-1,3-di(propylamido)cyclohexanetitanium diisopropoxide
5,5-diethyl-1,3-di(isopropylamido)cyclohexanetitanium diisopropoxide
5,5-dipropyl-1,3-di(isopropylamido)cyclohexanetitanium diisopropoxide
5,5-diisopropyl-1,3-di(isopropylamido)cyclohexanetitanium diisopropoxide
5,5-dibutyl-1,3-di(isopropylamido)cyclohexanetitanium diisopropoxide
5,5-di-sec-butyl-1,3-di(isopropylamido)cyclohexanetitanium diisopropoxide
5,5-di-tert-butyl-1,3-di(isopropylamido)cyclohexanetitanium diisopropoxide
5,5-dimethyl-1,3-di(butylamido)cyclohexanetitanium diisopropoxide
5,5-diethyl-1,3-di(butylamido)cyclohexanetitanium diisopropoxide
5,5-dipropyl-1,3-di(butylamido)cyclohexanetitanium diisopropoxide
5,5-diisopropyl-1,3-di(butylamido)cyclohexanetitanium diisopropoxide
5,5-dibutyl-1,3-di(butylamido)cyclohexanetitanium diisopropoxide
5,5-di-sec-butyl-1,3-di(butylamido)cyclohexanetitanium diisopropoxide
5,5-di-tert-butyl-1,3-di(butylamido)cyclohexanetitanium diisopropoxide
5,5-dimethyl-1,3-di(methylphosphido)cyclohexanetitanium dichloride
5,5-diethyl-1,3-di(methylphosphido)cyclohexanetitanium dichloride
5,5-dipropyl-1,3-di(methylphosphido)cyclohexanetitanium dichloride
5,5-diisopropyl-1,3-di(methylphosphido)cyclohexanetitanium dichloride
5,5-dibutyl-1,3-di(methylphosphido)cyclohexanetitanium dichloride
5,5-di-sec-butyl-1,3-di(methylphosphido)cyclohexanetitanium dichloride
5,5-di-tert-butyl-1,3-di(methylphosphido)cyclohexanetitanium dichloride
5,5-dimethyl-1,3-di(ethylphosphido)cyclohexanetitanium dichloride
5,5-diethyl-1,3-di(ethylphosphido)cyclohexanetitanium dichloride
5,5-dipropyl-1,3-di(ethylphosphido)cyclohexanetitanium dichloride
5,5-diisopropyl-1,3-di(ethylphosphido)cyclohexanetitanium dichloride
5,5-di-sec-butyl-1,3-di(ethylphosphido)cyclohexanetitanium dichloride
5,5-di-tert-butyl-1,3-di(ethylphosphido)cyclohexanetitanium dichloride
5,5-dimethyl-1,3-di(propylphosphido)cyclohexanetitanium dichloride
5,5-diethyl-1,3-di(propylphosphido)cyclohexanetitanium dichloride
5,5-dipropyl-1,3-di(propylphosphido)cyclohexanetitanium dichloride
5,5-diisopropyl-1,3-di(propylphosphido)cyclohexanetitanium dichloride
5,5-dibutyl-1,3-di(propylphosphido)cyclohexanetitanium dichloride
5,5-di-sec-butyl-1,3-di(propylphosphido)cyclohexanetitanium dichloride
5,5-di-tert-butyl-1,3-di(propylphosphido)cyclohexanetitanium dichloride
5,5-dimethyl-1,3-di(propylphosphido)cyclohexanetitanium dichloride
5,5-diethyl-1,3-di(isopropylphosphido)cyclohexanetitanium dichloride
5,5-dipropyl-1,3-di(isopropylphosphido)cyclohexanetitanium dichloride
5,5-diisopropyl-1,3-di(isopropylphosphido)cyclohexanetitanium dichloride
5,5-dibutyl-1,3-di(isopropylphosphido)cyclohexanetitanium dichloride
5,5-di-sec-butyl-1,3-di(isopropylphosphido)cyclohexanetitanium dichloride
5,5-di-tert-butyl-1,3-di(isopropylphosphido)cyclohexanetitanium dichloride
5,5-dimethyl-1,3-di(butylphosphido)cyclohexanetitanium dichloride
5,5-diethyl-1,3-di(butylphosphido)cyclohexanetitanium dichloride
5,5-dipropyl-1,3-di(butylphosphido)cyclohexanetitanium dichloride
5,5-diisopropyl-1,3-di(butylphosphido)cyclohexanetitanium dichloride
5,5-dibutyl-1,3-di(butylphosphido)cyclohexanetitanium dichloride
5,5-di-sec-butyl-1,3-di(butylphosphido)cyclohexanetitanium dichloride
5,5-di-tert-butyl-1,3-di(butylphosphido)cyclohexanetitanium dichloride
5,5-dimethyl-1,3-di(methylphosphido)cyclohexanedimethyltitanium
5,5-diethyl-1,3-di(methylphosphido)cyclohexanedimethyltitanium
5,5-dipropyl-1,3-di(methylphosphido)cyclohexanedimethyltitanium
5,5-diisopropyl-1,3-di(methylphosphido)cyclohexanedimethyltitanium
5,5-dibutyl-1,3-di(methylphosphido)cyclohexanedimethyltitanium
5,5-di-sec-butyl-1,3-di(methylphosphido)cyclohexanedimethyltitanium
5,5-di-tert-butyl-1,3-di(methylphosphido)cyclohexanedimethyltitanium
5,5-dimethyl-1,3-di(ethylphosphido)cyclohexanedimethyltitanium
5,5-diethyl-1,3-di(ethylphosphido)cyclohexanedimethyltitanium
5,5-dipropyl-1,3-di(ethylphosphido)cyclohexanedimethyltitanium
5,5-diisopropyl-1,3-di(ethylphosphido)cyclohexanetitanium dichloride
5,5-di-sec-butyl-1,3-di(ethylphosphido)cyclohexanedimethyltitanium
5,5-di-tert-butyl-1,3-di(ethylphosphido)cyclohexanedimethyltitanium
5,5-dimethyl-1,3-di(propylphosphido)cyclohexanedimethyltitanium
5,5-diethyl-1,3-di(propylphosphido)cyclohexanedimethyltitanium 5,5-dipropyl-1,3-di(propylphosphido)cyclohexanedimethyltitanium
5,5-diisopropyl-1,3-di(propylphosphido)cyclohexanedimethyltitanium
5,5-dibutyl-1,3-di(propylphosphido)cyclohexanedimethyltitanium
5,5-di-sec-butyl-1,3-di(propylphosphido)cyclohexanedimethyltitanium
5,5-di-tert-butyl-1,3-di(propylphosphido)cyclohexanedimethyltitanium
5,5-dimethyl-1,3-di(propylphosphido)cyclohexanedimethyltitanium
5,5-diethyl-1,3-di(isopropylphosphido)cyclohexanedimethyltitanium
5,5-dipropyl-1,3-di(isopropylphosphido)cyclohexanedimethyltitanium
5,5-diisopropyl-1,3-di(isopropylphosphido)cyclohexanedimethyltitanium
5,5-dibutyl-1,3-di(isopropylphosphido)cyclohexanedimethyltitanium
5,5-di-sec-butyl-1,3-di(isopropylphosphido)cyclohexanedimethyltitanium
5,5-di-tert-butyl-1,3-di(isopropylphosphido)cyclohexanedimethyltitanium
5,5-dimethyl-1,3-di(butylphosphido)cyclohexanedimethyltitanium
5,5-diethyl-1,3-di(butylphosphido)cyclohexanedimethyltitanium
5,5-dipropyl-1,3-di(butylphosphido)cyclohexanedimethyltitanium
5,5-diisopropyl-1,3-di(butylphosphido)cyclohexanedimethyltitanium
5,5-dibutyl-1,3-di(butylphosphido)cyclohexanedimethyltitanium
5,5-di-sec-butyl-1,3-di(butylphosphido)cyclohexanedimethyltitanium
5,5-di-tert-butyl-1,3-di(butylphosphido)cyclohexanedimethyltitanium
5,5-dimethyl-1,3-di(methylphosphido)cyclohexanetitanium diisopropoxide
5,5-diethyl-1,3-di(methylphosphido)cyclohexanetitanium diisopropoxide
5,5-dipropyl-1,3-di(methylphosphido)cyclohexanetitanium diisopropoxide
5,5-diisopropyl-1,3-di(methylphosphido)cyclohexanetitanium diisopropoxide
5,5-dibutyl-1,3-di(methylphosphido)cyclohexanetitanium diisopropoxide
5,5-di-sec-butyl-1,3-di(methylphosphido)cyclohexanetitanium diisopropoxide
5,5-di-tert-butyl-1,3-di(methylphosphido)cyclohexanetitanium diisopropoxide
5,5-dimethyl-1,3-di(ethylphosphido)cyclohexanetitanium diisopropoxide
5,5-diethyl-1,3-di(ethylphosphido)cyclohexanetitanium diisopropoxide
5,5-dipropyl-1,3-di(ethylphosphido)cyclohexanetitanium diisopropoxide
5,5-diisopropyl-1,3-di(ethylphosphido)cyclohexanetitanium diisopropoxide
5,5-di-sec-butyl-1,3-di(ethylphosphido)cyclohexanetitanium diisopropoxide
5,5-di-tert-butyl-1,3-di(ethylphosphido)cyclohexanetitanium diisopropoxide
5,5-dimethyl-1,3-di(propylphosphido)cyclohexanetitanium diisopropoxide
5,5-diethyl-1,3-di(propylphosphido)cyclohexanetitanium diisopropoxide
5,5-dipropyl-1,3-di(propylphosphido)cyclohexanetitanium diisopropoxide
5,5-diisopropyl-1,3-di(propylphosphido)cyclohexanetitanium diisopropoxide
5,5-dibutyl-1,3-di(propylphosphido)cyclohexanetitanium diisopropoxide
5,5-di-sec-butyl-1,3-di(propylphosphido)cyclohexanetitanium diisopropoxide
5,5-di-tert-butyl-1,3-di(propylphosphido)cyclohexanetitanium diisopropoxide
5,5-dimethyl-1,3-di(propylphosphido)cyclohexanetitanium diisopropoxide
5,5-diethyl-1,3-di(isopropylphosphido)cyclohexanetitanium diisopropoxide
5,5-dipropyl-1,3-di(isopropylphosphido)cyclohexanetitanium diisopropoxide
5,5-diisopropyl-1,3-di(isopropylphosphido)cyclohexanetitanium diisopropoxide
5,5-dibutyl-1,3-di(isopropylphosphido)cyclohexanetitanium diisopropoxide
5,5-di-sec-butyl-1,3-di(isopropylphosphido)cyclohexanetitanium diisopropoxide
5,5-di-tert-butyl-1,3-di(isopropylphosphido)cyclohexanetitanium diisopropoxide
5,5-dimethyl-1,3-di(butylphosphido)cyclohexanetitanium diisopropoxide
5,5-diethyl-1,3-di(butylphosphido)cyclohexanetitanium diisopropoxide
5,5-dipropyl-1,3-di(butylphosphido)cyclohexanetitanium diisopropoxide
5,5-diisopropyl-1,3-di(butylphosphido)cyclohexanetitanium diisopropoxide
5,5-dibutyl-1,3-di(butylphosphido)cyclohexanetitanium diisopropoxide
5,5-di-sec-butyl-1,3-di(butylphosphido)cyclohexanetitanium diisopropoxide
5,5-di-tert-butyl-1,3-di(butylphosphido)cyclohexanetitanium diisopropoxide
2,5,5-trimethyl-1,3-di(methylamido)cyclohexanetitanium dichloride
2,5,5-trimethyl-1,3-di(ethylamido)cyclohexanetitanium dichloride
2,5,5-trimethyl-1,3-di(propylamido)cyclohexanetitanium dichloride
2,5,5-trimethyl-1,3-di(isopropylamido)cyclohexanetitanium dichloride
2,5,5-trimethyl-1,3-di(butylamido)cyclohexanetitanium dichloride
2,5,5-trimethyl-1,3-di(methylamido)cyclohexanedimethyltitanium
2,5,5-trimethyl-1,3-di(benzylamido)cyclohexanetitanium dichloride
2,5,5-trimethyl-1,3-di(methylamido)cyclohexanedibenzyltitanium
2-ethyl-5,5-dimethyl-1,3-di(methylamido)cyclohexanetitanium dichloride
2-ethyl-5,5-dimethyl-1,3-di(ethylamido)cyclohexanetitanium dichloride
2-ethyl-5,5-dimethyl-1,3-di(isopropylamido)cyclohexanetitanium dichloride
2-ethyl-5,5-dimethyl-1,3-di(propylamido)cyclohexanetitanium dichloride
2-ethyl-5,5-dimethyl-1,3-di(butylamido)cyclohexanetitanium dichloride 2-ethyl-5,5-dimethyl-1,3-di(methylamido) cyclohexanedimethyltitanium
2-ethyl-5,5-dimethyl-1,3-di(methylamido) cyclohexanedibenzyltitanium
2-butyl-5,5-dimethyl-1,3-di(methylamido) cyclohexanetitanium dichloride
2-butyl-5,5-dimethyl-1,3-di(ethylamido) cyclohexanetitanium dichloride
2-butyl-5,5-dimethyl-1,3-di(propylamido) cyclohexanetitanium dichloride
2-butyl-5,5-dimethyl-1,3-di(butylamido) cyclohexanetitanium dichloride
2-butyl-5,5-dimethyl-1,3-di(isopropylamido) cyclohexanetitanium dichloride
2-butyl-5,5-dimethyl-1,3-di(methylamido) cyclohexanedimethyltitanium
2-butyl-5,5-dimethyl-1,3-di(benzylamido) cyclohexanetitanium dichloride
2-butyl-5,5-dimethyl-1,3-di(methylamido) cyclohexanedibenzyltitanium
2-butyl-5,5-dimethyl-1,3-di(methylamido) cyclohexanedibutyltitanium
2-benzyl-5,5-dimethyl-1,3-di(methylamido) cyclohexanetitanium dichloride
2-benzyl-5,5-dimethyl-1,3-di(ethylamido) cyclohexanetitanium dichloride
2-benzyl-5,5-dimethyl-1,3-di(propylamido) cyclohexanetitanium dichloride
2-benzyl-5,5-dimethyl-1,3-di(isopropylamido) cyclohexanetitanium dichloride
2-benzyl-5,5-dimethyl-1,3-di(butylamido) cyclohexanetitanium dichloride
2-benzyl-5,5-dimethyl-1,3-di(benzylamido) cyclohexanetitanium dichloride
2-benzyl-5,5-dimethyl-1,3-di(methylamido) cyclohexanedimethyltitanium
2-benzyl-5,5-dimethyl-1,3-di(methylamido) cyclohexanedibutyltitanium
2-benzyl-5,5-dimethyl-1,3-di(methylamido) cyclohexanedibenzyltitanium
2-benzyl-5,5-dimethyl-1,3-di(benzylamido) cyclohexanedimethyltitanium
2-benzyl-5,5-dimethyl-1,3-di(benzylamido) cyclohexanedibenzyltitanium
2-benzyl-5,5-dimethyl-1,3-di(benzylamido) cyclohexanedibutyltitanium
2-benzyl-5,5-dimethyl-1,3-di(isopropylamido) cyclohexanedimethyltitanium.

Mixtures of various metal complexes can also be used.

The metal complexes 1,3-dimethylamido-5,5-dimethylcyclohexanetitanium dichloride, 1,3-dimethylamido-5,5-dimethylcyclohexanedimethyltitanium and 1,3-di(isopropylamido)-2,5,5-trimethylcyclohexanetitanium dichloride are particularly preferred.

The metal complexes of the formula I can be prepared by the following methods:

A compound of the formula II

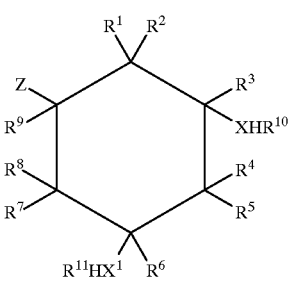

II is metallated.

This is preferably done by reacting a compound of the formula II with hydrides, carboorganic compounds, nitrogen-organic compounds or organosilicon compounds of alkali metals or alkaline earth metals and then treating the product with halogen, alkoxy or aryloxy compounds of M.

Compounds of the formula II can be prepared as follows:

A compound of the formula V

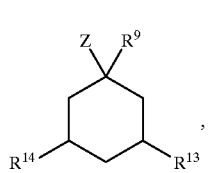

V where $R^{13}$ and $R^{14}$ are $=O$, $=S$ or $=NR^{15}$ where $R^{15}$ is hydrogen, $C_1$–$C_{10}$-alkyl or $C_4$–$C_6$-cycloalkyl, can be reacted with hydrides or amides of alkali metals or alkaline earth metals or with carboorganic compounds or organosilicon compounds, which may also contain halogens, to give compounds of the formula IV

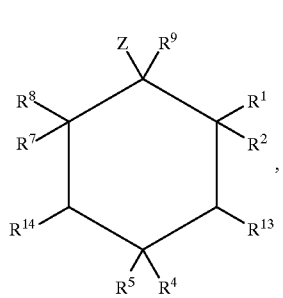

IV which may be reduced to give compounds of the formula III

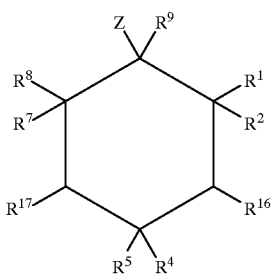

III where $R^{16}$ and $R^{17}$ are —OH, —SH, —NHR$^{15}$,
and these can be converted into compounds of the formula II by introducing, if desired, tosylate, mesylate or triflate groups and subsequently treating with amine, alkali metal amide or alkali metal phosphide.

Compounds of the formula II can also be prepared as follows:

A compound of the formula VI

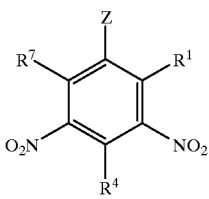

VI is reduced to give compounds of the formula VII

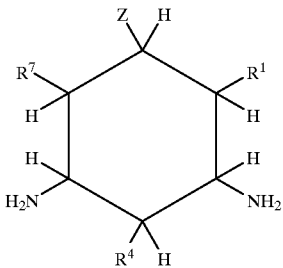

VII which can be alkylated on the nitrogen to give compounds of the formula II.

The preparation of compounds of the formula I is preferably carried out by dissolving a compound of the formula II in a solvent such as THF, diethyl ether, dioxane or toluene, preferably in THF, and reacting it at from −78 to 60° C. with preferably a 2.1 molar amount of metallating reagents such as alkali metal hydrides, butyllithium, methyllithium, phenyllithium, naphthalenesodium, lithium diisopropylamide or lithium bis(trimethylsilyl)amide, preferably butyllithium, and subsequently reacting the product with transition metal halides, alkoxides or amides, preferably chlorides, or transition metal chloride-THF complexes.

If desired, compounds of the formula I can be modified by replacement of the halogen ligands on M. Preferably, compounds of the formula I are dissolved in solvents such as THF, diethyl ether or toluene at from −78 to 100° C. and treated with an at least twice molar amount of methylmagnesium chloride, butyllithium, methyllithium or benzylmagnesium bromide to give alkyl or arylalkyl derivatives of compounds of the formula I.

The compounds of the formula II are preferably obtained by

A) if appropriate, reaction of compounds of the formula V with alkali metal hydrides, butyllithium, methyllithium, phenyllithium, naphthalenesodium, lithium diisopropylamide, lithium bis(trimethylsilyl)amide or alkali metal alkoxides, preferably lithium diisopropylamide or potassium tert-butoxide, in solvents such as THF, diethyl ether, dioxane, toluene or alcohols, preferably THF or butanol, at from −78 to 65° C. with a 1–3.5 molar amount of alkyl halides, trialkylsilyl chlorides or arylalkyl halides to give compounds of the formula IV. Compounds of the formula IV are preferably reduced to compounds of the formula III by reaction with lithium aluminum hydride, sodium borohydride or other customary reducing agents, where a twice molar amount of reducing agent is added at from −78 to 100° C. in THF, diethyl ether, dioxane or toluene. Compounds of the formula III are preferably reacted with p-toluenesulfonyl chloride, trifluoromethanesulfonic anhydride or methanesulfonyl chloride, particularly preferably trifluoromethanesulfonic anhydride, in the presence of 1–2 molar amounts of bases such as pyridine, quinoline or triethylamine in solvents such as THF, DMF, acetonitrile, dimethyl sulfoxide, diethyl ether or methylene chloride at from −78 to 60° C. The intermediates are preferably reacted in situ with methylamine, lithium isopropylamide, lithium methylamide, lithium butylphosphide or lithium phenylphosphide at from −78 to 60° C. to give compounds of the formula II.

B) Compounds of the formula VII are preferably obtained by reducing compounds of the formula VI with hydrogen, if desired in the presence of catalysts such as Ni, platinum, Raney nickel or ruthenium, in solvents such as THF, toluene, diethyl ether, dioxane or methanol at from −78 to 120° C.

Compounds of the formula VII can, if appropriate, be dissolved in solvents such as THF, diethyl ether or toluene and reacted at from −78 to 80° C. with customary alkylating agents, for example methyl iodide or isopropyl bromide, to give compounds of the formula II.

As compound B) capable of forming metallocenium ions, the catalyst systems of the present invention may comprise open-chain or cyclic aluminoxane compounds.

Suitable compounds B) are, for example, open-chain or cyclic aluminoxane compounds of the formula VIII or IX

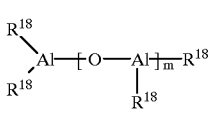

VIII

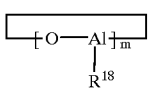

IX where $R^{18}$ is a $C_1$–$C_4$-alkyl group, preferably a methyl or ethyl group, and m is an integer from 5 to 30, preferably from 10 to 25.

The preparation of these oligomeric aluminoxane compounds is usually carried out by reacting a solution of trialkylaluminum with water and is described, for example, in EP-A 284 708 and U.S. Pat. No. 4,794,096.

In general, the oligomeric aluminoxane compounds obtained in this way are in the form of mixtures of both linear and cyclic chain molecules of various lengths, so that m is to be regarded as a mean. The aluminoxane compounds can also be present in admixture with other metal alkyls, preferably aluminum alkyls.

It has been found to be advantageous to use the metal complexes and the oligomeric aluminoxane compound in such amounts that the atomic ratio of aluminum from the oligomeric aluminoxane compound to the transition metal from the metal complexes is in the range from $10:1$ to $10^6:1$, in particular in the range from $10:1$ to $10^4:1$.

Solvents used for these catalyst systems are usually aromatic hydrocarbons, preferably having from 6 to 20 carbon atoms, in particular xylenes and toluene and also mixtures thereof.

Other compounds which can be used as compound B) capable of forming metallocenium ions are coordination compounds selected from the group consisting of strong, uncharged Lewis acids, ionic compounds containing Lewis-acid cations and ionic compounds containing Brönsted acids as cations.

As strong, uncharged Lewis acids, preference is given to compounds of the formula X

$$M^2X^2X^3X^4 \qquad X,$$

where
$M^2$ is an element of main group III of the Periodic Table, in particular B, Al or Ga, preferably B,
$X^2, X^3$ and $X^4$ are hydrogen, $C_1$–$C_{10}$-alkyl, $C_6$–$C_{15}$-aryl, alkylaryl, arylalkyl, haloalkyl or haloaryl each having from 1 to 10 carbon atoms in the alkyl radical and from 6 to 20 carbon atoms in the aryl radical or fluorine, chlorine, bromine or iodine, in particular haloaryls, preferably pentafluorophenyl.

Particular preference is given to compounds of the formula X in which $X^2$, $X^3$ and $X^4$ are identical, preferably tris(pentafluorophenyl)borane. These compounds and methods for preparing them are known per se and are described, for example, in WO 93/3067.

Suitable ionic compounds containing Lewis-acid cations are compounds of the formula XI

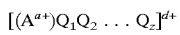

$$[(A^{a+})Q_1Q_2 \ldots Q_z]^{d+} \qquad XI,$$

where
A is an element of main groups I to VI or transition groups I to VIII of the Periodic Table,
$Q_1$ to $Q_z$ are singly negatively charged groups such as $C_1$–$C_{28}$-alkyl, $C_6$–$C_{15}$-aryl, alkylaryl, arylalkyl, haloalkyl, haloaryl each having from 6 to 20 carbon atoms in the aryl part and from 1 to 28 carbon atoms in the alkyl part, $C_1$–$C_{10}$-cycloalkyl which may bear $C_1$–$C_{10}$-alkyl groups as substituents, halogen, $C_1$–$C_{28}$-alkoxy, $C_6$–$C_{15}$-aryloxy, silyl or mercaptyl groups,
a is an integer from 1 to 6,
z is an integer from 0 to 5 and
d corresponds to the difference a–z, but d is greater than or equal to 1.

Particularly suitable Lewis-acid cations are carbonium cations, oxonium cations and sulfonium cations and also cationic transition metal complexes. Particular mention may be made of the triphenylmethyl cation, the silver cation and the 1,1'-dimethylferrocenyl cation.

They preferably have non-coordinating counterions, in particular boron compounds as are also mentioned in WO 91/09882, preferably tetrakis(pentafluorophenyl)borate.

Ionic compounds containing Brönsted acids as cations and preferably likewise non-coordinating counterions are mentioned in WO 93/3067; the preferred cation is N,N-dimethylanilinium.

It has been found to be particularly useful for the molar ratio of boron from the compound capable of forming metallocenium ions to transition metal from the metal complex to be in the range from 0.1:1 to 10:1, in particular in the range from 1:1 to 5:1.

The catalyst systems of the present invention can be used in unsupported or supported form.

Suitable support materials are, for example, silica gels, preferably those of the formula $SiO_2 \cdot bAl_2O_3$, where b is from 0 to 2, preferably from 0 to 0.5; i.e. essentially aluminosilicates or silicon dioxide. The supports preferably have a particle diameter in the range from 1 to 200 $\mu$m, in particular from 30 to 80 $\mu$m. Such products are commercially available, e.g. as silica gel 332 from Grace.

Further possible supports are, inter alia, finely divided polyolefins, for example finely divided polypropylene or polyethylene, and also polyethylene glycol, polybutylene terephthalate, polyethylene terephthalate, polyvinyl alcohol, polystyrene, polybutadiene, polycarbonates or copolymers thereof.

It is additionally possible to add trialkylaluminum compounds to the catalyst systems of the present invention. Preference is given to triisobutylaluminum, trimethylaluminum, triethylaluminum and mixtures thereof. The molar amount of these compounds is preferably from 0.1:1 to $10^4$:1, based on the catalyst system.

The catalyst systems of the present invention can be used for polymerizing olefinically unsaturated, in particular vinylaromatic, compounds. It is possible to prepare homopolymers or copolymers of vinylaromatic compounds. For the preparation of copolymers, preference is given to using olefinic compounds as comonomers.

Suitable vinylaromatic compounds are, for example, those of the formula

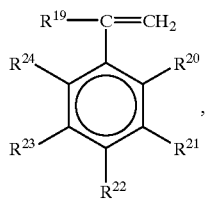

XII where the substituents have the following meanings:
$R^{19}$ is hydrogen or $C_1$–$C_4$-alkyl,
$R^{20}$ to $R^{24}$ are, independently of one another, hydrogen, $C_1$–$C_{12}$-alkyl, $C_2$–$C_4$-alkenyl, $C_6$–$C_{18}$-aryl, halogen or two adjacent radicals together form a cyclic group having from 4 to 15 carbon atoms.

Preference is given to using vinylaromatic compounds of the formula XII in which
$R^{19}$ is hydrogen
and
$R^{20}$ to $R^{24}$ are hydrogen, $C_1$–$C_4$-alkyl, chlorine or phenyl or two adjacent radicals together form a cyclic group having from 4 to 12 carbon atoms, giving, for example, naphthalene derivatives or anthracene derivatives as compounds of the formula XII.

Examples of such preferred compounds are:
styrene, p-methylstyrene, p-chlorostyrene, 2,4-dimethylstyrene, 1,4-divinylbenzene, 4-vinylbiphenyl, 2-vinylnaphthalene and 9-vinylanthracene.

It is also possible to use mixtures of various vinylaromatic compounds, but preference is given to using only one vinylaromatic compound.

Particularly preferred vinylaromatic compounds are styrene and p-methylstyrene.

The preparation of vinylaromatic compounds of the formula XII is known per se and is described, for example, in Beilstein 5, 367, 474, 485.

Other suitable vinylaromatic compounds are 1,1-diphenylethene and its derivatives.

As olefinic compounds, it is possible to use, for example, ethylene or $C_3$–$C_{20}$-alkenes, in particular $C_3$–$C_{18}$-alk-1-enes. Preference is given to ethylene, propylene, 1-butene, isobutene, 4-methyl-1-pentene, 1-hexene, 1-octene, 1-octadecene and mixtures thereof. Particular preference is given to ethylene.

However, it is also possible to use dienes such as butadiene, 2-methylbutadiene or 1,5-hexadiene or cyclic compounds such as norbornene, cyclohexene, cyclooctadiene or mixtures thereof as comonomers.

The molar ratio of comonomers to vinylaromatic compounds can be varied within a wide range; it is preferably in the range from 0.01:1 to 50:1.

The polymerization conditions are not critical per se; the polymerization is preferably carried out at pressures in the range from 0.1 to 100 bar, in particular from 1 to 50 bar, at temperatures in the range from 0 to 150° C., in particular from 40 to 100° C., and for times of from 1 to 10 hours.

The polymerization can be stopped by addition of protic compounds, for example methanol. The polymer can be separated out by precipitation in excess methanol.

The polymerization is preferably carried out in bulk, for example in styrene, propene, butene or hexene, or in solution. Suitable solvents are aliphatic or aromatic hydrocarbons, for example butane, pentane, hexane, cyclohexane, toluene, xylenes, ethylbenzene or mixtures thereof.

The catalyst systems of the present invention can be used for polymerizing ethylenically unsaturated, in particular vinylaromatic compounds, and in the process effectively suppress β-hydride elimination. They are also stereoselective.

The polymers formed have a high molecular weight and may have a high proportion of syndiotactic structure, i.e. the syndiotactic proportion determined by $^{13}$C-NMR is greater than 50%, preferably greater than 60%, in particular greater than 85%, in the homopolymers of vinylaromatic compounds.

In the copolymers, the proportion of vinylaromatic compounds is preferably from 1 to 85 mol %, in particular from 10 to 50 mol %.

The polymers are suitable for producing fibers, films and moldings.

EXAMPLES

Example 1

Preparation of 1,3-dimethylamido-5,5-dimethylcyclohexanetitanium dichloride I1 a) 5,5-dimethylcyclohexane-1,3-diol 14.0 g (0.1 mol) of dimedone were dissolved in 200 ml of THF. 3.8 g (0.1 mol) of $NaBH_4$ and 5 mmol of $CeCl_3$ dissolved in 50 ml of THF were then added at −30° C. The mixture was stirred at room temperature for another 2 hours and was hydrolyzed at 0° C. by means of methanol/water. The organic phase was separated off and the solvent was removed. The residue was extracted with ethanol and unreacted dimedone was removed by crystallization. This gave 11.5 g (80%) of 5,5-dimethylcyclohexane-1,3-diol.

b) 5,5-dimethylcyclohexane 1,3-ditosylate 0.28 mol of absolute pyridine was carefully added at 0° C. to a solution of 10.8 g (75 mmol) of 5,5-dimethylcyclohexane-1,3-diol and 26.7 g (0.14 mol) of p-toluenesulfonyl chloride in 180 ml of methylene chloride. After warming to room temperature, the mixture was stirred for a further 2 hours and subsequently hydrolyzed by addition of 100 g of ice and 30 ml of concentrated sulfuric acid. The organic phase was separated off and the solvent was removed under reduced pressure. The crude product was recrystallized from methylene chloride/diethyl ether. Yield: 22.2 g (70%).

c) 1,3-dimethylamino-5,5-dimethylcyclohexane 20.3 g (45 mmol) of 5,5-dimethylcyclohexane 1,3-ditosylate were dissolved in 200 ml of ethanol/water and admixed with 90 mmol of aqueous methylamine. The mixture was stirred for 12 hours at room temperature. After addition of sodium bicarbonate, the solution was extracted a number of times with diethyl ether. The ether extracts were evaporated to dryness and the crude product was washed with water. Yield: 6.1 g (79%).

d) 1,3-dimethylamido-5,5-dimethylcyclohexanetitanium dichloride I1

5.1 g (30 mmol) of 1,3-dimethylamino-5,5-dimethylcyclohexane were dissolved in 75 ml of THF at −78° C. and admixed with 60 mmol of n-butyllithium. The mixture was warmed to room temperature and stirred for 12 hours. The solvent was removed and the residue was digested a number of times with diethyl ether. The resulting 1,3-dimethylamido-5,5-dimethylcyclohexanedilithium compound was redissolved at −78° C. in 75 ml of absolute THF and admixed with a solution of 5.9 g (31 mmol) of $TiCl_4$ in 15 ml of THF. The cooling was removed and the mixture was stirred for a further 15 hours. The precipitated LiCl was filtered off and the THF solution was evaporated under reduced pressure. The oil which remained was recrystallized from diethyl ether/THF, giving a crystalline solid. Yield: 6.7 g (78%).

Examples 2 to 6

Preparation of syndiotactic polystyrene

The metal complex I1 was dissolved in 5 ml of a 0.1 molar solution of triisobutylaluminum in toluene and added to a mixture of styrene and a 1.53 molar solution of methylaluminoxane (MAO) in toluene. Polymerization was subsequently carried out in a kneader and was stopped by addition of 15 ml of methanol.

The experimental conditions and results are shown in Table 1.

The syndiotactic content (rr=triads) was determined by $^{13}$C-NMR.

The mean molecular weights $M_w$ (weight average) were determined by means of gel permeation chromatography at 135° C. in 1,2,4-trichlorobenzene using a polystyrene standard.

TABLE 1

| Ex. | Il [mg] | Temperature [° C.] | Styrene [g] | MAO [ml] | Polymerization time [min] | Yield [g] | rr [%] | $M_w$ |
|---|---|---|---|---|---|---|---|---|
| 2 | 14.3 | 60 | 910 | 9.8 | 30 | 591 | 89 | 590,000 |
| 3 | 7.2 | 60 | 910 | 4.9 | 45 | 546 | 90 | 720,000 |
| 4 | 2.9 | 60 | 455 | 3.3 | 60 | 205 | 90 | 740,000 |
| 5 | 28.6 | 60 | 910 | 19.6 | 30 | 637 | 86 | 620,000 |
| 6 | 14.3 | 50 | 910 | 9.8 | 30 | 437 | 92 | 850,000 |

Examples 7 to 11

Preparation of copolymers of styrene and ethylene

A mixture of styrene and a 1.53 molar solution of methylaluminoxane (MAO) in toluene, if desired together with toluene as solvent, was placed in a 2 l pressure autoclave. The temperature was increased to 60° C. and ethylene was injected. A mixture of 20 μmol of I1 and 5 ml of a 0.1 molar solution of triisobutylaluminum in toluene was added thereto. The introduction of ethylene was adjusted so that the ethylene pressure remained constant. The polymerization was stopped by addition of 20 ml of methanol and the polymer was obtained by precipitation in excess, HCl-containing methanol.

The experimental conditions and results are shown in Table 2.

The styrene content of the polymer was determined by quantitative evaluation of the $^{13}$C-NMR spectra. The weight average $M_w$ was determined by means of GPC (gel permeation chromatography) in trichlorobenzene at 120° C. using a polystyrene standard.

TABLE 2

| Ex. | Amount of styrene used [g] | MAO [ml] | Toluene [g] | Ethylene pressure [bar] | Polymerization time [min] | Yield [g] | Styrene content of polymer [mol %] | $M_w$ |
|---|---|---|---|---|---|---|---|---|
| 7 | 172 | 7.8 | 1100 | 5 | 60 | 190 | 17 | 190000 |
| 8 | 172 | 7.8 | 1100 | 2 | 60 | 134 | 25 | 124000 |
| 9 | 344 | 7.8 | 627 | 2 | 45 | 148 | 29 | 118000 |
| 10 | 31 | 15.6 | 1150 | 15 | 15 | 324 | 9 | 354000 |
| 11 | 1365 | 15.6 | — | 5 | 60 | 105 | 19 | 130000 |

We claim:

1. A catalyst system comprising as active constituents
A) metal complexes of the formula I

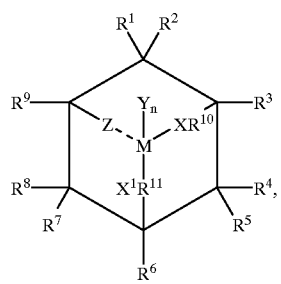

where the substituents have the following meanings:
M is a metal of transition group III, IV, V or VI of the Periodic Table of the Elements or a metal of the lanthanide series,
Y is a negative leaving atom or a negative leaving group,
X and $X^1$ are negatively charged or uncharged atoms of main group IV, V or VI of the Periodic Table of the Elements,
Z is hydrogen, $C_1$–$C_{10}$-alkyl, $C_3$–$C_{10}$-cycloalkyl, $C_1$–$C_{10}$-alkoxy, $C_1$–$C_{10}$-alkylthio or dialkylamido having from 1 to 4 carbon atoms in each alkyl radical,
$R^1$ to $R^{11}$ are hydrogen, carboorganic or organosilicon radicals,
n is 0, 1 or 2
and
the valence of M is 2+n,
and
B) a compound capable of forming metallocenium ions.

2. The catalyst system of claim 1, wherein M in the formula I is a metal of transition group IV or V of the Periodic Table of the Elements.

3. The catalyst system of claim 1, wherein Y in the formula I is hydrogen, $C_1$–$C_{10}$-alkyl, $C_3$–$C_{10}$-cycloalkyl, $C_1$–$C_{10}$-alkoxy, dialkylamido, alkylaryl, arylalkyl, haloalkyl or haloaryl each having from 1 to 10 carbon atoms in the alkyl radical and from 6 to 20 carbon atoms in the aryl radical, or fluorine, chlorine, bromine or iodine.

4. The catalyst system of claim 1, wherein X and $X^1$ in the formula I are each a negatively charged atom of main group V or VI of the Periodic Table of the Elements.

5. The catalyst system of claim 1, wherein Z in the formula I is hydrogen or $C_1$–$C_4$-alkyl or $C_3$–$C_6$-cycloalkyl.

6. The catalyst system of claim 1, wherein the compound B) capable of forming metallocenium ions which is used comprises open-chain or cyclic aluminoxane compounds of the formula VIII or IX

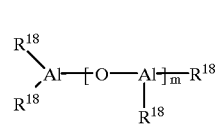

VIII

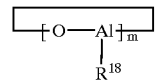

IX where $R^{18}$ is a $C_1$–$C_4$-alkyl group and m is an integer from 5 to 30.

7. The catalyst system of claim 1, wherein the compound B) capable of forming metallocenium ions which is used is a coordination compound selected from the group consisting of strong, uncharged Lewis acids, ionic compounds containing Lewis-acid cations and ionic compounds containing Brönsted acids as cations.

8. A method of polymerizing olefinically unsaturated compounds which comprises: contacting the olefinically unsaturated compounds with the catalyst system defined in claim 1.

9. A process for preparing polymers of vinylaromatic compounds which comprises: contacting said compounds with the catalyst system defined in claim 1.

* * * * *